(12) United States Patent
Yum et al.

(10) Patent No.: US 7,121,110 B2
(45) Date of Patent: Oct. 17, 2006

(54) AIR CONDITIONING SYSTEM

(75) Inventors: Kwan Ho Yum, Seoul (KR); Ho Seon Choi, Seoul (KR); Kyung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/754,599

(22) Filed: Jan. 12, 2004

(65) Prior Publication Data

US 2004/0244402 A1  Dec. 9, 2004

(30) Foreign Application Priority Data

Jun. 3, 2003  (KR) ............... 10-2003-0035572

(51) Int. Cl.
*F25D 17/06*  (2006.01)
(52) U.S. Cl. .................. 62/411; 62/423
(58) Field of Classification Search .......... 62/411, 62/418, 412, 407, 410, 426, 259.1, 423; 454/296, 906
See application file for complete search history.

(56) References Cited

U.S. PATENT DOCUMENTS

| | | | | |
|---|---|---|---|---|
| 3,855,814 A | * | 12/1974 | Eubank | 62/244 |
| 4,048,811 A | * | 9/1977 | Ito et al. | 62/263 |
| 4,562,955 A | * | 1/1986 | Horster et al. | 237/2 B |
| 4,617,805 A | * | 10/1986 | Ikemura et al. | 62/259.1 |
| 5,314,376 A | * | 5/1994 | Kuramarohit | 454/186 |
| 5,595,068 A | * | 1/1997 | Amr | 62/418 |

FOREIGN PATENT DOCUMENTS

| | | |
|---|---|---|
| CN | 2191378 | 3/1995 |
| CN | 1232945 | 10/1999 |
| DE | 4002560 | 8/1991 |
| DE | 2314924 | 1/1998 |
| JP | 9-210405 | 8/1997 |
| JP | 11-153332 | 6/1999 |
| JP | 2001-227772 | 8/2001 |
| JP | 2001324 /96 A | * 11/2001 |
| KR | 2002-0044792 | 6/2002 |

OTHER PUBLICATIONS

U.S. Appl. No. 10/754,579, Lee et al., entitled "Air Conditioning System," filed Jan. 12, 2004.
U.S. Appl. No. 10/682,972, Park et al., entitled "Multi-Type Air Conditioner," filed Oct. 14, 2003.
U.S. Appl. No. 10/754,514, Kim et al., entitled "Air Conditioning System," filed Jan. 12, 2004.

(Continued)

*Primary Examiner*—Melvin Jones
(74) *Attorney, Agent, or Firm*—Greenblum & Bernstein, P.L.C.

(57) ABSTRACT

The present invention discloses an improved air conditioning system which can supply fresh air prepared separately. A first preferred embodiment of the present invention provides an air conditioning system including an outdoor unit, an indoor unit installed in a ceiling, and means connected to the indoor unit for supplying fresh air stored separately to the indoor unit. A second preferred embodiment of the present invention provides an air conditioning system including an outdoor unit, an indoor unit, air supply and air discharge ducts, and means connected to the air supply duct for supplying fresh air stored separately to the indoor unit. In the second embodiment, the indoor unit includes a fan, an indoor heat exchanger, and a guide duct for guiding flow passages of the external air and room air, and, if necessary, further including a preheat exchanger arranged to surround the guide duct for indirect heat exchange between the external air and the indoor air.

38 Claims, 10 Drawing Sheets

OTHER PUBLICATIONS

U.S. Appl. No. 10/694,017, Lee et al., entitled "Combined Ventilating and Air Conditioning System," filed Oct. 28, 2003.
English language Abstract of JP2001-227772.
English language Abstract of JP 9-210405.
English language Abstract of JP 11-153332.
English Language abstract of CN1232945.

* cited by examiner

AIR CONDITIONING SYSTEM

This application claims the benefit of the Korean Application No. P2003-35572 filed on Jun. 3, 2003, which is hereby incorporated by reference.

BACKGROUND OF THE INVENTION

1. Field of the Invention

The present invention relates to air conditioning systems, and more particularly, to an improved air conditioning system, in which fresh air prepared separately can be supplied to a room.

2. Background of the Related Art

The air conditioner is an appliance for cooling or heating a room by using a property of refrigerant in which the refrigerant discharges or absorbs heat to/from an environment when the refrigerant undergoes a phase change.

In general, the air conditioner is provided with an indoor unit and an outdoor unit, wherein the air conditioner having the indoor unit and the outdoor unit combined into one unit is called as a unit type air conditioner, and the air conditioner having the indoor unit and the outdoor unit fabricated individually is called as a separate type air conditioner.

As a typical example of the unit type air conditioner, there is a window type air conditioner, and as the separate type air conditioners, there are a ceiling type air conditioner, a wall mounting type air conditioner, and a package type air conditioner. In a case of the ceiling type air conditioner, the indoor unit is installed in the ceiling, in a case of the wall mounting type, the indoor unit is mounted on a wall, and in a case of the package type air conditioner, the indoor unit stands on a floor in a room.

In general, the air conditioner includes a compressor, a condenser, an expansion device, and an evaporator. The compressor compresses low temperature/low pressure gas refrigerant to high temperature/high pressure refrigerant, and makes the refrigerant to pass through different units. The condenser condenses the gas refrigerant from the compressor into a liquid refrigerant. In this instance, as the refrigerant discharges heat when the refrigerant is condensed, the condenser discharges heat to an environment. As the heat is discharged from the condenser to the room, the room can be heated.

In general, as the expansion device, expanding the condensed refrigerant by decompression, capillary tubes are used. The evaporator vaporizes the expanded refrigerant, when the refrigerant absorbs heat to cool down air around the evaporator. When such a cooled down air is discharged to the room, the room can be cooled down.

In the meantime, for reducing heat loss during use of the air conditioner, the room is closed. Air in such a closed room is polluted gradually as time passes by. For an example, breathing of persons in the room makes a carbon dioxide content in the room air higher, and there is much dust circulating in the dry air. Therefore, after using the air conditioner for a time period, it is required to supply external air fresh relative to the room air into the room.

There are two ways of ventilation. One is forced discharge of an inside air by using a ventilating device, and the other is opening door or window for natural ventilation. Both methods supply external air to the room. However, if the outdoor air is heavily polluted by environmental pollution or sandy dust phenomena, the ventilation of the room with the outdoor air can pollute the room air, on the contrary.

In the ventilation, cold or hot air is discharged to an outside of the room directly, and external air is introduced into the room through an opened door or window, directly. Accordingly, there is a great loss of heat in the ventilation, to require, not only much energy, but also a long time to cool or heat the room again.

In the meantime, if the air conditioning system is provided with a ventilation device, the air conditioning system requires a great number of ducts, to make installation complicate and difficult.

SUMMARY OF THE INVENTION

Accordingly, the present invention is directed to an air conditioning system that substantially obviates one or more of the problems due to limitations and disadvantages of the related art.

An object of the present invention is to provide an improved air conditioning system which can supply fresh air prepared separately to a room.

Other object of the present invention is to provide an improved air conditioning system which can reduce waste of energy taken place in the ventilation.

Another object of the present invention is to provide an improved air conditioning system which has a compact indoor unit to install with easy.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning system includes an outdoor unit having a compressor and an outdoor heat exchanger, an indoor unit in a ceiling having an indoor heat exchanger with a space therein in communication with a room, and a fan in the space for drawing, and discharging air through the indoor heat exchanger, and means connected to the indoor unit for supplying fresh air stored separately to an inlet side of the fan under the control of a controlling part.

The air conditioning system may further include a guide duct provided under the indoor heat exchanger, for guiding room air and the fresh air from the means to the fan, and air passed through the indoor heat exchanger to the room.

The means may include a tank for storage of fresh air, having a nozzle and a controlling part for controlling opening/closing of the nozzle, and a hose having one end connected to the nozzle and the other end connected to the indoor unit.

In other aspect of the present invention, there is provided an air conditioning system including an outdoor unit having a compressor and an outdoor heat exchanger, an indoor unit in a ceiling having an indoor heat exchanger with a space therein in communication with a room, a fan in the space for drawing, and discharging air through the indoor heat exchanger, and a guide duct under the indoor heat exchanger for guiding external air to the room through the fan and room air to an outside of the room, an air supply duct and an air discharge duct in communication with the guide duct for guiding the external air to the room and the room air to the outside of the room respectively, and means connected to the air supply duct for supplying fresh air stored separately to an inlet side of the fan under the control of a controlling part.

The air conditioning system may further include a preheat exchanger arranged to surround the guide duct, and connected to the air supply duct, the air discharge duct, and the guide duct, for indirect heat exchange between the external air and the room air passing through insides of the preheat exchanger.

The guide duct may include a first duct under the indoor heat exchanger for guiding the external air passed through the preheat exchanger to the fan, and a second duct under the first duct for guiding the room air to the preheat exchanger.

The guide duct may include a first hole provided in a central part in an up/down direction so as to make the space and the room in communication, and at least one or more than second hole provided around the first hole in the up/down direction for introduction of the air passed through the indoor heat exchanger into the room.

The first duct may include at least one or more than one first inlet provided to one side thereof so as to be in communication with the preheat exchanger, and at least one or more than one first outlet form in an inside circumferential surface thereof for communication with the first hole. The second duct may include at least one or more than one second inlet provided to an inside circumferential surface thereof so as to be in communication with the first hole, and at least one, or more than one second outlet provided to one side thereof so as to be in communication with the preheat exchanger.

The preheat exchanger may include a vacant case having a third outlet in communication wit the first inlet in the guide duct, and a fourth inlet in communication with the second outlet in the guide duct, and means in the case for indirect heat exchange between the external air passing through the first inlet and the third outlet, and the room air passing through the second outlet and the fourth inlet.

The heat exchange means may include a plurality of plates spaced at regular intervals to form first flow passages for flow of the external air, and second flow passages for flow of the room air in layers alternately, and a plurality of flow guides each provided between adjacent plates in each of the layers in parallel to flow directions of the external air and room air respectively, having a cross section with a plurality of folds.

The air conditioning system may further include an air supply fan on the air supply duct for supplying the external air to the room, and an air discharge fan on the air discharge duct for discharging the room air to the outside of the room. The air supply duct may further include a valve mounted between an end in communication with the outside of the room and a point the means is connected for opening/closing a flow passage of the room air.

The means may include a tank having a nozzle in communication with the air supply duct, and a controlling part for controlling open/close of the nozzle, for storage of fresh air in a compressed state.

Preferably, the tank is rechargeable with the fresh air, and the hose is detachable to the nozzle. The fresh air is air having one or more than one of features of taken in a mountainous area, air having dust removed therefrom, air having a high oxygen content, air having terpene added thereto, air having phytoncide added thereto. It is preferable that the fresh air is stored in the means in a compressed state.

It is to be understood that both the foregoing description and the following detailed description of the present invention are exemplary and explanatory and are intended to provide further explanation of the invention claimed.

BRIEF DESCRITPION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted.

The air conditioning system of the present invention provides a ceiling type air conditioner in which an indoor unit is installed in a ceiling. The air conditioning system of the present invention ventilates room air, during which the air supplied to a room recovers heat from the air discharged to an outside of room.

Figure 2:
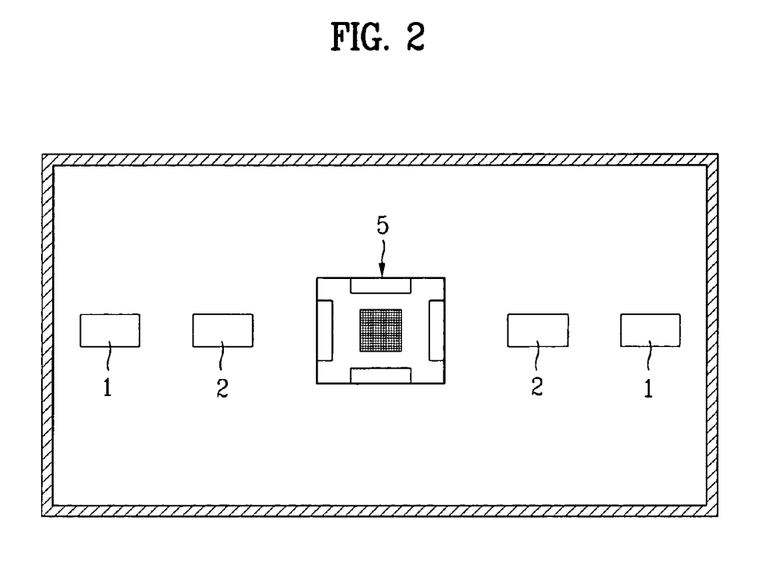
FIG. 2 illustrates a view of the air conditioning system in FIG. 1 installed on a ceiling looked up from below.
Figure 3:
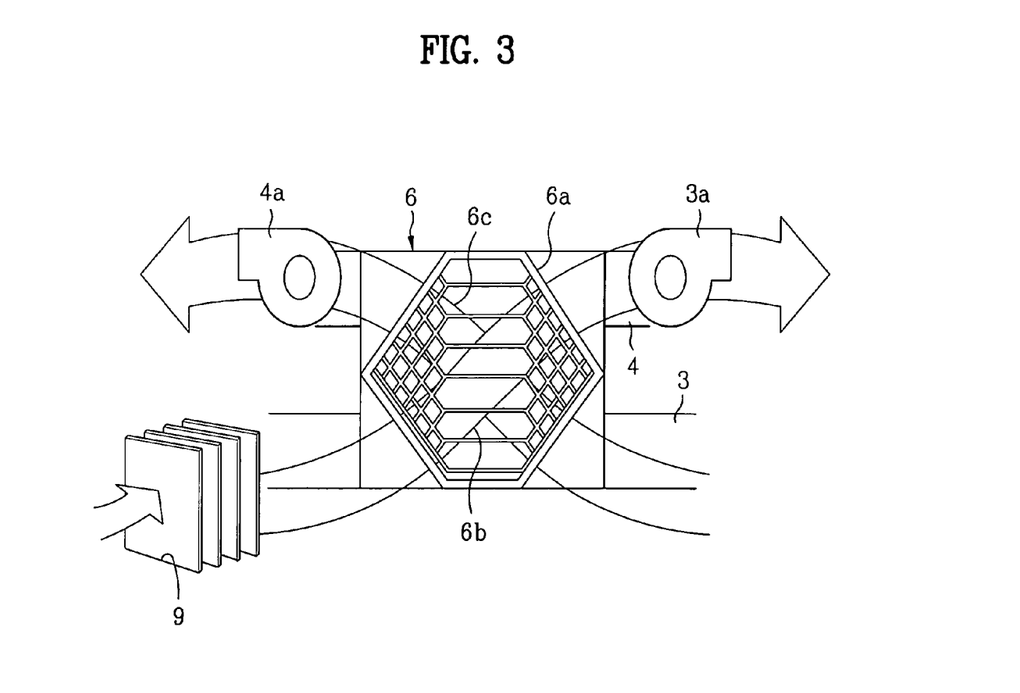
FIG. 3 illustrates heat exchange between external air and room air in the air conditioning system in FIG. 1, schematically.

The air conditioning system of the present invention will be described with reference to the attached drawings, in more detail. For reference, FIG. 1 illustrates an air conditioning system in accordance with a preferred embodiment of the present invention schematically, FIG. 2 illustrates a view of the air conditioning system in FIG. 1 installed on a ceiling looked up from below, and FIG. 3 illustrates heat exchange between external air and room air in the air conditioning system in FIG. 1, schematically.

Figure 1:
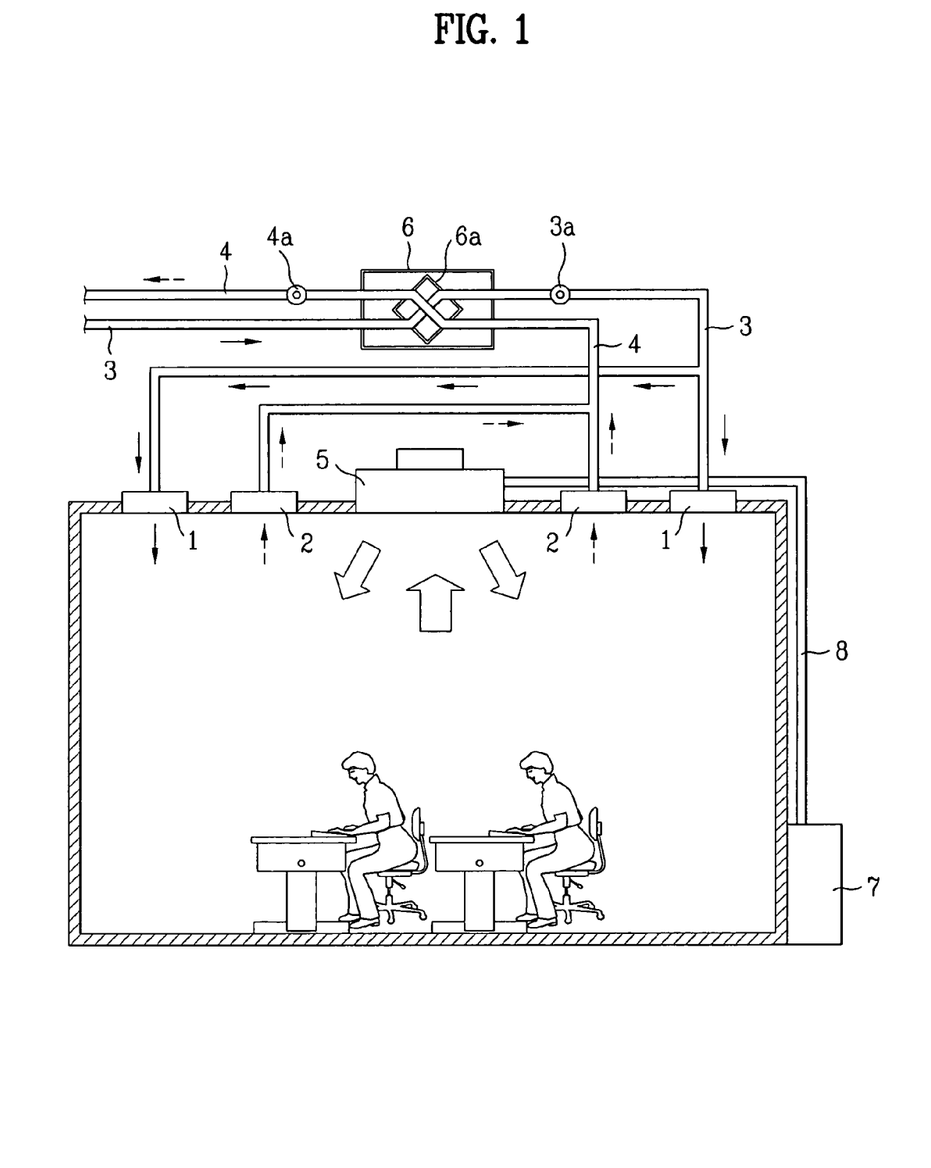
FIG. 1 illustrates an air conditioning system in accordance with a preferred embodiment of the present invention, schematically.

Referring to FIG. 1, an indoor unit 5 is installed in the ceiling of a room so as to be in communication with the room. The indoor unit 5 includes an indoor heat exchanger (not shown), an indoor expansion device (not shown), and an indoor fan (not shown). As shown in FIG. 2, there are a plurality of air discharging ports and air supply ports 1 in the ceiling in the room at points predetermined distances away from the indoor unit 5. The air discharge duct 4 is connected to the air discharge port 2, and the air supply duct 3 is connected to the air supply port 1. One ends of the air supply duct 3 and the air discharge ducts 4 are connected to the outside of the room. There is a preheat exchanger 6 in the middle of the air supply duct 3 and the air discharge duct 4 for indirect heat exchange of external air and room air flowing therein while the external air and the room air cross each other. There are an air supply fan 3a and an air discharge fan 4a mounted on the air supply duct 3 and the air discharge duct 4a, respectively.

In the meantime, the outdoor unit 7 in an outdoor includes an outdoor heat exchanger (not shown), and a compressor (not shown), which are identical to known outdoor unit, and no more description of which will be provided. As shown in FIG. 1, the outdoor unit 7 is connected to the indoor unit 5 with a refrigerant pipeline 8.

In the operation, referring to FIG. 1, when the outdoor unit and the indoor unit 5 are put into operation, the room air is introduced into the indoor unit 5, heat exchanges with the indoor heat exchanger, and discharged to the room, again. According to this, the room is cooled or heated. After the room is cooled or heated for a time period, ventilation is required, of which process will be described.

In the ventilation, the air discharge fan 8 and the air supply fan 7 are operated. According to this, the external air is introduced into the room through the air supply duct 3 and the air supply port 1, and the room air is discharged to the outside of the room through the air discharge duct 4 and the air discharge port 2. In this instance, the room air and the external air flowing through the air discharge duct 4 and the air supply duct 3 indirectly heat exchange at the preheat exchanger 6. Therefore, the external air receives a portion of thermal energy from the room air discharged to the outside of the room, before introduction into the room, according to which loss of thermal energy caused in the ventilation can be reduced. A structure and operation of the preheat exchanger 6 will be described in more detail with reference to FIG. 3.

Referring to FIG. 3, the preheat exchanger 6 is provided with heat exchange means 6a, including a plurality of first flow passages 6b for guiding the external air to the room, and a plurality of second flow passages 6c for guiding the room air to the outside of the room. The plurality of first and second flow passages 6b and 6c are separated with a plurality of plates so as not to be in communication. Since the first flow passage 6b and the second flow passage 6c are formed between the plates, heat transfers through the plate when the external air and the room air pass through the first flow passage 6b and the second flow passage 6c, respectively. According to this, the external air introduced into the room through the first flow passage 6b receives thermal energy from the room air discharged to the outside of the room through the second flow passage 6c. Therefore, the air conditioning system of the present invention can reduce an energy loss in ventilation. In the meantime, an unexplained reference symbol 9 in FIG. 3 denotes a filter, for filtering the external air introduced into the room from the outside.

The foregoing air conditioning system of the present invention recovers the thermal energy of the room air discharged to the outside of room with the air supplied to the room in ventilation. According to this, rapid change of the room temperature in the ventilation can be prevented, and an energy saving effect can be obtained. However, despite of the advantages, the air conditioning system described with reference to FIGS. 1 and 3 has the following problems.

First, in a case outdoor air is heavily polluted with environmental pollution or the yellow sand, filtering performance of the filter 9 drops significantly, and a flow rate in the ventilation drops.

Second, the air supply and discharge ducts in the ceiling in the room is long and very complicate. Moreover, the preheat exchanger is mounted in the middle of the air supply and discharge ducts. Accordingly, it is difficult to make the indoor unit and the preheat exchanger compact, and difficult to install, to require much material and installation cost.

Third, the thermal loss and pressure loss in the long air supply and discharge duct from the ceiling to the preheat exchanger drops a preheat exchange efficiency in the ventilation.

Figure 5:
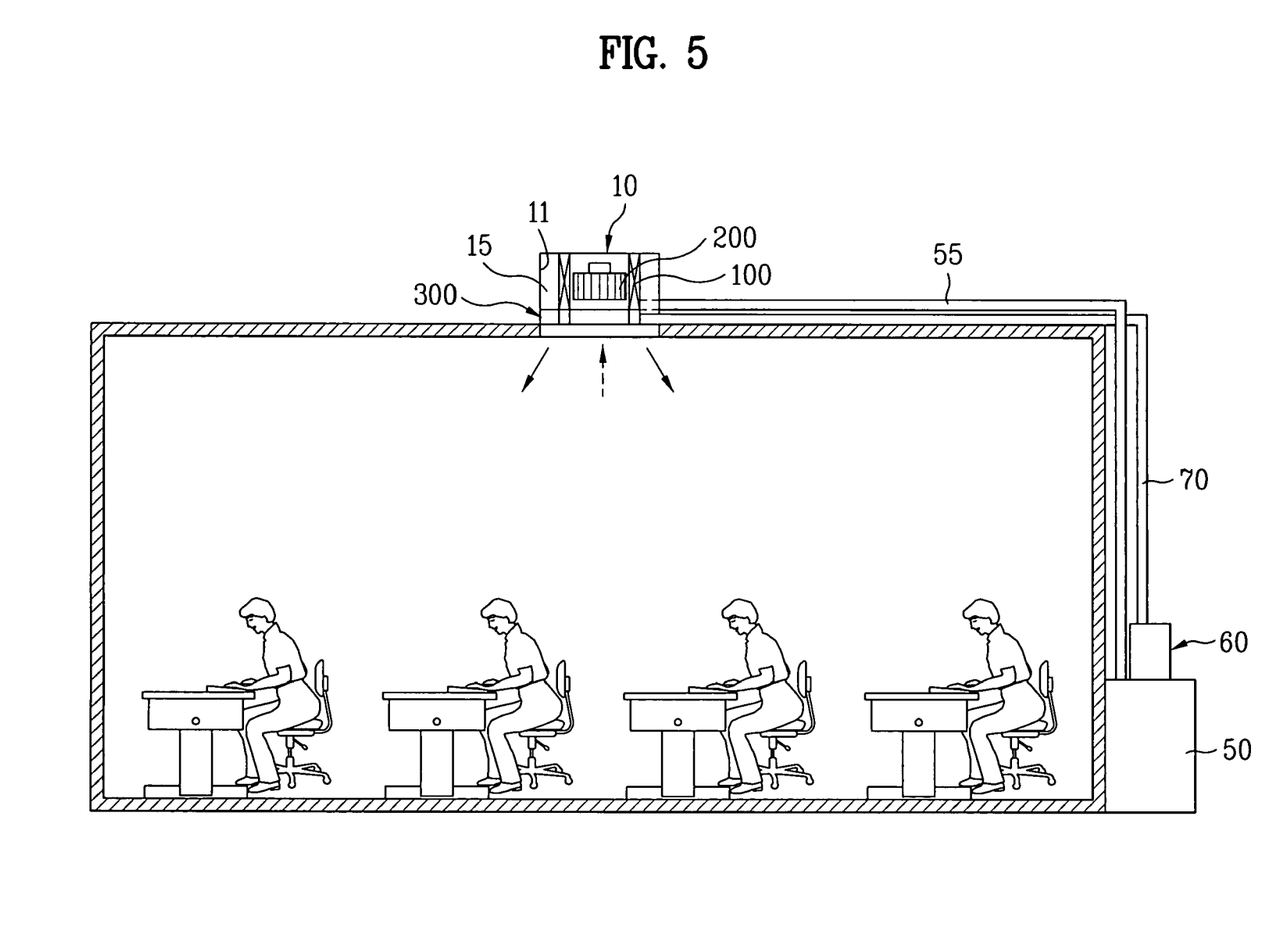
FIG. 5 illustrates an air conditioning system of an improved structure in accordance with a first preferred embodiment of the present invention.
Figure 6:
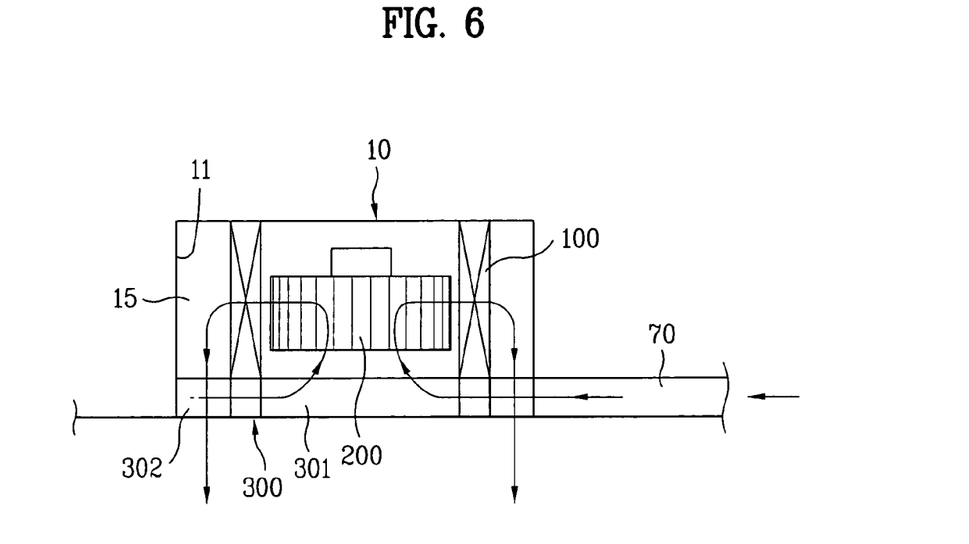
FIG. 6 illustrates an indoor unit of the air conditioning system in FIG. 5 in accordance with a preferred embodiment of the present invention.
Figure 7:
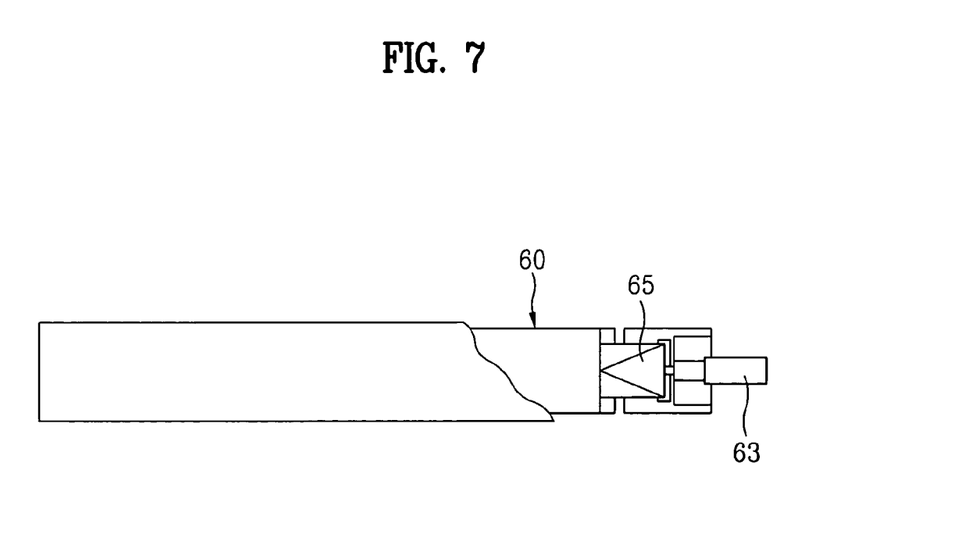
FIG. 7 illustrates a tank in the air conditioning system in FIG. 5 in accordance with a preferred embodiment of the present invention.

Therefore, an improved air conditioning system that can solve the foregoing problem is provided. FIGS. 5~7 illustrate the improved air conditioning system in accordance with a first preferred embodiment of the present invention. The improved air conditioning system in accordance with a first preferred embodiment of the present invention will be described with reference to above drawings. FIG. 5 illustrates an air conditioning system of an improved structure in accordance with a first preferred embodiment of the present invention, FIG. 6 illustrates an indoor unit of the air conditioning system in FIG. 5 in accordance with a preferred embodiment of the present invention, and FIG. 7 illustrates a tank in the air conditioning system in FIG. 5 in accordance with a preferred embodiment of the present invention.

Referring to FIG. 5, the indoor unit 10 is installed at one point in the ceiling in the room so as to be in communication with the room. As shown in FIGS. 5 and 6, the indoor unit 10 includes an indoor heat exchanger 100, a fan 200, and a guide duct 300. The indoor heat exchanger 100 is mounted in an indoor unit case 11, and has a form with an inside space in communication with the room. The indoor heat exchanger 100 may have a form, for an example, surrounding the space. In this case, the space may be in communication with the room through an opened bottom side of the indoor heat exchanger 100. In the meantime, as shown in FIG. 6, it is preferable that an outside circumferential surface of the indoor heat exchanger 100 and an inside circumferential surface of the indoor unit case has a fixed distance, for securing a discharge flow passage 15 so that the air discharged from the fan and passed through the indoor heat exchanger 100 moves toward the room.

Referring to FIGS. 5 and 6, the fan 200 is mounted in the space in the indoor heat exchanger 100. The fan 200 draws air, and discharges into the room through the indoor heat exchanger 100. In the meantime, it is preferable that the fan 200 provided to the air conditioning system in accordance with a first preferred embodiment of the present invention includes a centrifugal fan that draws air from one side, for an example, from a bottom side, and discharges in a radial direction. In this case, referring to FIGS. 5 and 6, the centrifugal fan is mounted in the inside space of the indoor heat exchanger 100, for drawing room air through the bottom side and discharges the room air in the radial direction. Then, the air discharged in the radial direction passes through the indoor heat exchanger 100 mounted to surround the centrifugal fan, and moves toward the room guided by the discharge flow passage 15 and the guide duct 300.

Referring to FIG. 6, the guide duct 300 is mounted under the indoor heat exchanger 100, and includes a first hole 301 for making the room and the space in communication, and a second hole 302 for making the discharge flow passage 15 and the room in communication, for guiding the room air or fresh air from means to be described later to the fan 200, and the air passed through the fan 200 and the indoor heat exchanger 100 to the room. In the meantime, though not shown in detail, a hose 70 of means connected to the guide duct 300 for supplying fresh air to an inlet of the fan 200 is connected so as to be in communication with the first hole 301.

There is an outdoor unit 50 installed in an outdoor, including a compressor (not shown), an outdoor expansion device (not shown), and an outdoor fan (not shown). Since the outdoor unit 50 is similar to known outdoor unit, no more description will be provided. As shown in FIG. 5, the outdoor unit 50 and the indoor unit 10 is connected with a refrigerant pipeline 55.

Referring to FIG. 5, the means for supplying the fresh air stored separately to the inlet side of the fan 200 includes a tank 60 and the hose 70. As shown in FIG. 7, the tank 60, storing compressed air therein, includes a nozzle and a controlling part 65. The fresh air is discharged through the nozzle 63, and the controlling part 65 controls opening/closing of the nozzle 63. In this instance, the controlling part 65 provides a signal to an actuator having a solenoid valve or motor, and the like, and the actuator having the signal received from the controlling part 65 opens/closes the nozzle 63.

Referring to FIG. 5, the tank 60 is detachably mounted on the outdoor unit 50. However, it is not required to mount the tank 60 on the outdoor unit 50 necessarily, but the tank 60 may be mounted on other place which is easy to detach. In the meantime, it is preferable that compressed air is rechargeable in the tank 60. Since such a rechargeable tank is used generally, description of which will be omitted. It is preferable that the hose 70 and the nozzle 63 are detachably connected for easy recharging of the tank 60.

Referring to FIG. 5, the hose 70 has one end connected to the nozzle 63, and the other end connected to the indoor unit 10, more specifically to the guide duct 300. The hose 70 may be formed of a flexible material for easy mounting. The hose 70 guides the fresh air stored in a compressed state to the first hole 301 in the guide duct 300 when the nozzle 63 is opened under the control of the controlling part 65. As shown in FIG. 6, since the first hole 301 is positioned on an inlet side of the fan 200, the fresh air introduced into the guide duct 300 through the hose 70 is discharged into the room again through the fan 200 and the indoor heat exchanger 100.

The fresh air stored in the tank 60 may be air taken in a clean mountainous area. The air taken in the clean mountainous area contains much phytoncide and terpene, antibacterial substance, and has high oxygen content. The phytoncide is an aromatic chemical having a bactericidal activity, and insecticidal property trees emit for protecting themselves from microbes, such as bacteria and insects, of which major composition is terpene. The phytoncide has a pharmacological action of sterilization, efficacies of accelerating secretion of waste products and enhancing cardiopulmonary function, and stimulates autonomic nerves to stabilize mind and body. That is, the phytoncide and terpene are main compositions that provide a forest bath effect.

Thus, since the air taken in the clean mountainous area contains much phytoncide and terpene, if the air is stored in the tank 60 and supplied to the room, a body of man making activity in the room can obtain the frost bath effect. In the meantime, the fresh air stored in the tank 60 may be air taken directly in the clean mountainous area, or air that is prepared by artificially adding phytoncide and terpene that are extracted separately, or artificially produced to air having dusts and foreign matters removed therefrom.

Moreover, as the fresh air, only air from which dusts and foreign matters are removed by using separate filter, or air having high oxygen content, may be used. Oxygen containing anions may also be used. In the meantime, as the fresh air, air having only one of above features may be used, or air having two or more than two of the features may be used. It is preferable that the fresh air having the foregoing feature is stored in the tank 60 at a high pressure.

The operation of the improved air conditioning system having the foregoing technical features in accordance with a first preferred embodiment of the present invention will be described.

When the fan 200 is put into operation, the room air moves upward through the first hole 301 in the guide duct 300, and is discharged toward the indoor heat exchanger 100 by the fan 200. The air cooled or heated at the indoor heat exchanger 100 is discharged to the room again through the second hole 302 in the guide duct 300, to cool or heat the room.

In the meantime, the means in the first embodiment, supplying fresh air to the room, will be described, briefly. When the user selects a fresh air supply function with a remote controller or the like, the controlling part 65 provides a control signal, for an example, to the actuator. Then, the actuator comes into operation, to open a flow passage of the nozzle 63, to supply the fresh compressed air in the tank 60 through the hose 70, the first hole 301 in the guide duct 300, the fan 200, the indoor heat exchanger 100, and the second hole 302 in succession. In the meantime, when the fresh air stored in the tank 60 in a compressed state is used up, the tank 60 is replaced with a new tank.

Thus, if the air is taken, for an example, in the mountainous area, the fresh air supplied to the room carries out antibacterial and bactericidal activities, and provides the forest bath effect to a human body. In the meantime, with the supply of fresh air stored separately, a ventilation effect can be substituted. Therefore, even in a case outdoor air is polluted with environmental pollution or yellow sand, a comfortable room environment can be maintained without being ventilated with the outdoor air. Moreover, since no large amount of air is discharged to the outside of the room at a time, no thermal energy is wasted, to improve an energy efficiency. Moreover, since the indoor unit is very compact, and no installation of separate air supply and discharge ducts are required, the installation is very easy.

Figure 8:
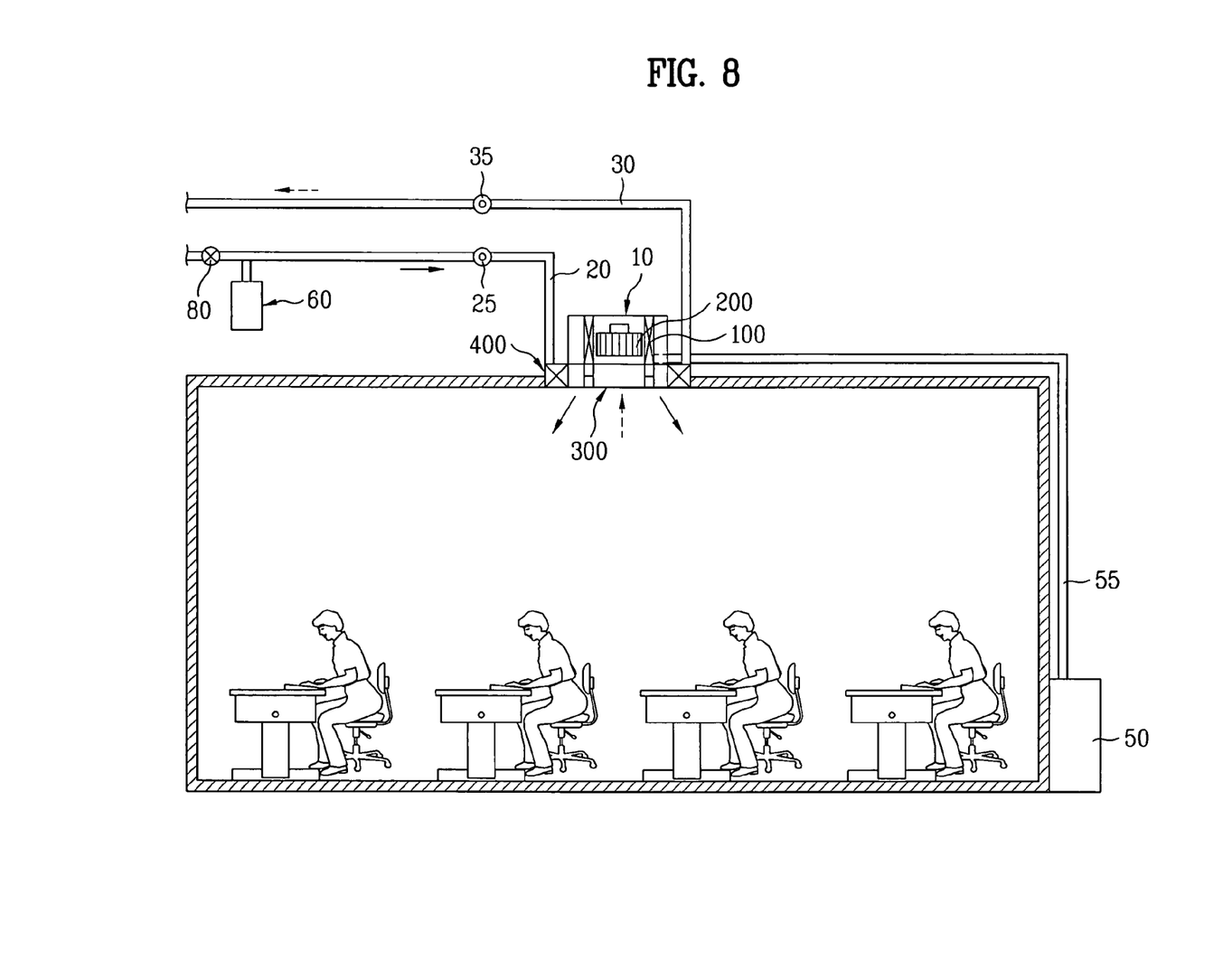
FIG. 8 illustrates an improved air conditioning system in accordance with a second preferred embodiment of the present invention, schematically.
Figure 9:
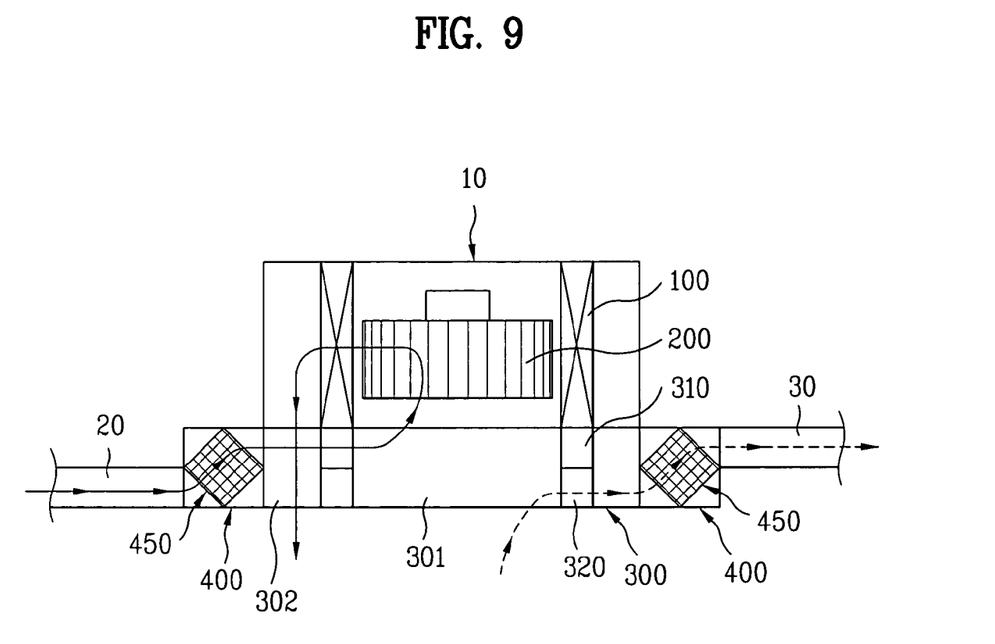
FIG. 9 illustrates an indoor unit of the air conditioning system in FIG. 8 in accordance with a preferred embodiment of the present invention.
Figure 10:
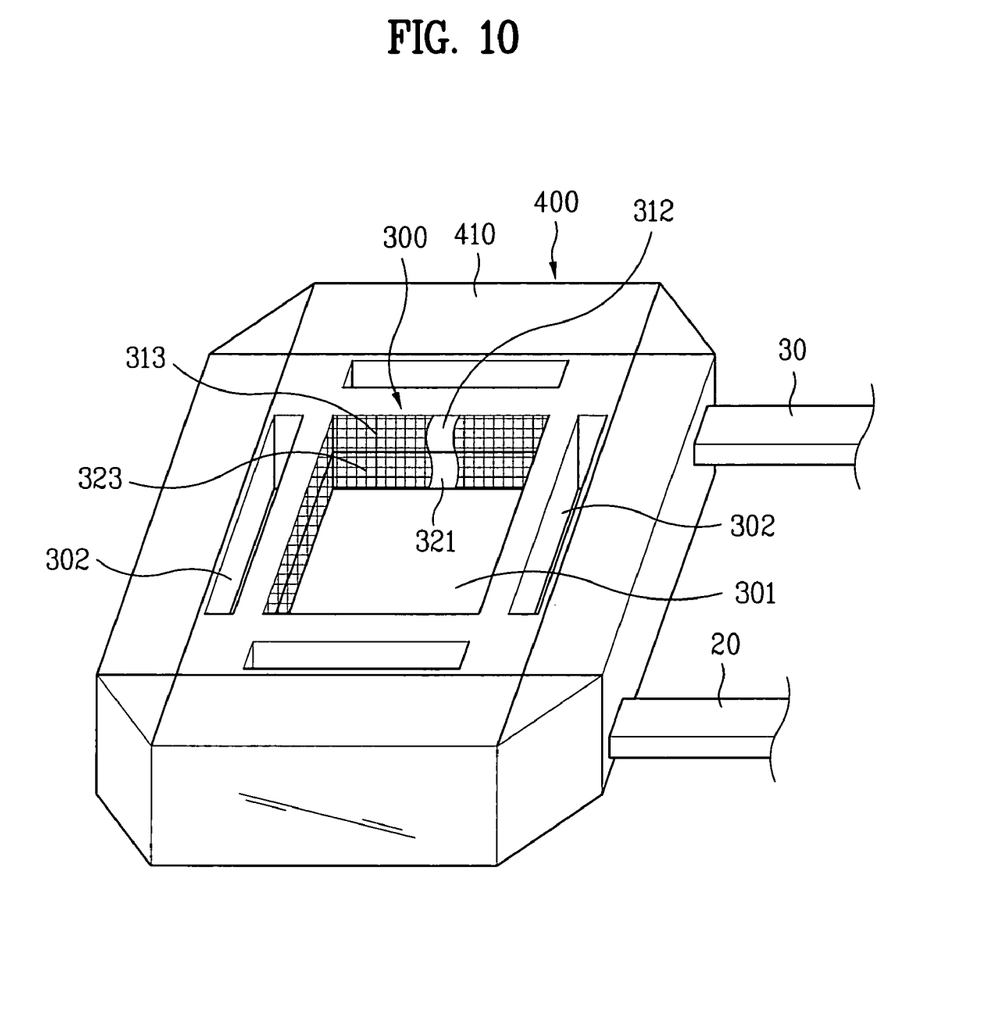
FIG. 10 illustrates a guide duct and a preheat exchanger of the air conditioning system in FIG. 8 in accordance with a preferred embodiment of the present invention.
Figure 11:
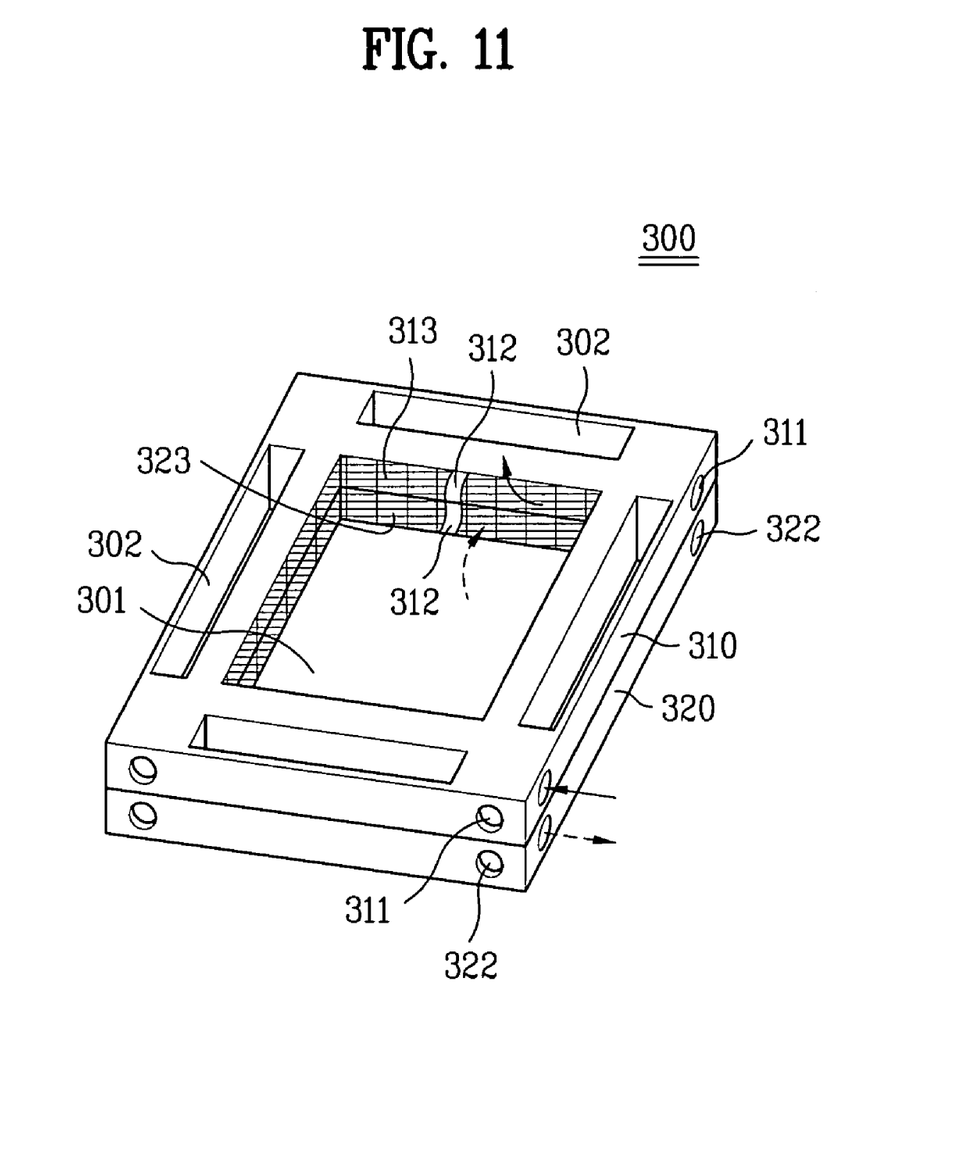
FIG. 11 illustrates a perspective view of the guide duct in FIG. 10.
Figure 12:
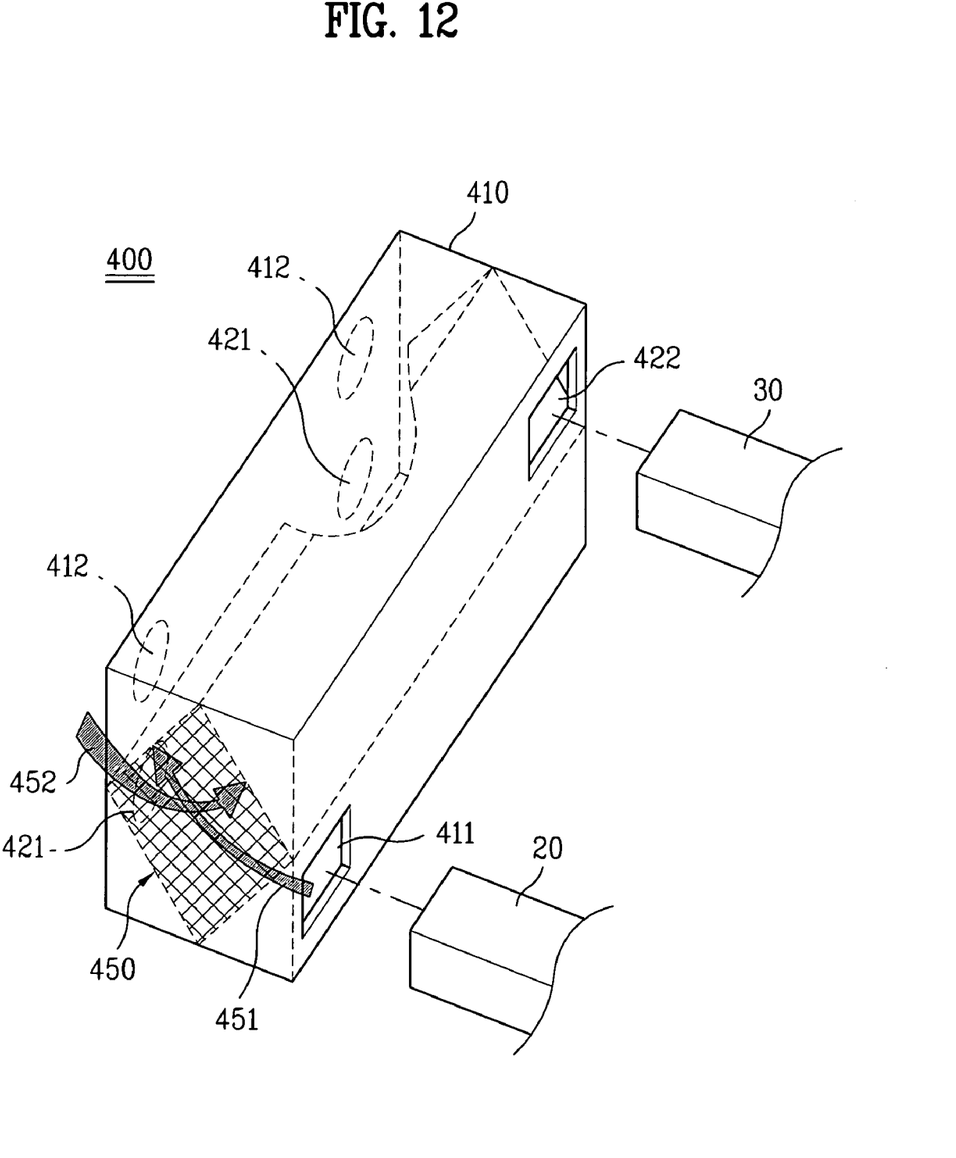
FIG. 12 illustrates a perspective view of the preheat exchanger in FIG. 10.

The present invention suggests, not only the foregoing air conditioning system, but also an improved air conditioning system which can supply fresh air stored separately to the room according to user's selection while the air conditioning system introduces the outdoor air into the room and discharges the room air to the outside of the room. This is realized with a second embodiment of the present invention. The second embodiment air conditioning system will be described with reference to FIGS. 8~12. FIG. 8 illustrates an improved air conditioning system in accordance with a second preferred embodiment of the present invention schematically, FIG. 9 illustrates an indoor unit of the air conditioning system in FIG. 8 in accordance with a preferred embodiment of the present invention, FIG. 10 illustrates a guide duct and a preheat exchanger of the air conditioning system in FIG. 8 in accordance with a preferred embodiment of the present invention, FIG. 11 illustrates a perspective view of the guide duct in FIG. 10, and FIG. 12 illustrates a perspective view of the preheat exchanger in FIG. 10. In describing the embodiment, parts the same with the first embodiment will be given the same names and reference symbols, and repetitive description of which will be omitted.

Referring to FIG. 8, the air conditioning system in accordance with a second preferred embodiment of the present invention includes an indoor unit 10, an outdoor unit 50, air supply and air discharge ducts 20 and 30, and means for supplying fresh air. The indoor unit 10 includes an indoor heat exchanger 100, a fan 200, and a guide duct 300, wherein description of the indoor heat exchanger 100 and the fan 200, similar to the ones in the first embodiment, will be omitted. In the meantime, an air supply duct 20 and an air discharge duct 30 are connected to the indoor unit 10. One ends of the air supply duct 20 and the air discharge duct 30 are arranged to be in communication with the outside of the room. An air supply fan 25 and an air discharge fan 35 are mounted on the air supply duct 20 and the air discharge duct 30, for enhancing an air supply and an air discharge capabilities, respectively.

The guide duct 300, under the indoor heat exchanger 100, guides external air to the room through the fan 200, and room air to the outside of the room through the air discharge duct 30. There may be a preheat exchanger 400 on an outside circumferential surface of the guide duct 300. The preheat exchanger 400 has the guide duct 300, and the air supply and discharge ducts 20 and 30 connected thereto, for indirect heat exchange of the external air and the room air. However, if no preheat exchanger 400 is provided, the air supply and discharge duct 20 and 30 are connected to the guide duct 300, directly. The structures of the guide duct 300 and the preheat exchanger 400 will be described in more detail, taking case the preheat exchanger 400 is provided to the air conditioning system in accordance with a second preferred embodiment of the present invention as an example.

Referring to FIGS. 9~11, the guide duct 300 includes a first duct 310 and a second duct 320. As shown in FIG. 9, the first duct 310 is under the indoor heat exchanger 100, and the second duct 320 is under the first duct 310. The first duct guides the external air passed through the air supply duct 20 and the preheat exchanger 40 to the fan 200. the second duct 320 guides the room air to the outside of the room through the preheat exchanger 400 and the air discharge duct 30. The guide duct 300 may be a unitized body having the first duct 310 and the second duct 320 attached rigidly.

Referring to FIGS. 10 and 11, the guide duct 300 has a plurality of holes in an up/down direction. Of the holes, as shown in FIGS. 9 and 11, the first hole 301 passes central parts of the guide duct 300, i.e., the first duct 310 and the second duct 320 in the up/down direction to make the space in the indoor heat exchanger 100 and the room in communication. The second hole 302 passes the guide duct 300, i.e., the first duct 310 and the second duct 320 around the first hole 301 in the up/down direction such that the air passed through the indoor heat exchanger 100 passes therethrough and is introduced into the room. At least one or more than one second hole 310 is provided, and in a case a plurality of the second holes 310 are provided, it is preferable that the second holes 310 are provided at regular intervals around the first hole 301.

In the meantime, in a case the first hole 301 and the second hole 302 are provided to the guide duct 300 thus, it is preferable that fan 200 is mounted right over the first hole 301, and the indoor heat exchanger 100 stands on top of the first duct 310 between the first hole 301 and the second hole 302.

In the meantime, the first duct 310 and the second duct 320 have a plurality of inlets and outlets for introduction/discharge of the external air and the room air, respectively. The inlets and outlets, provided in an outside circumferential surface and an inside circumferential surface of the first duct 310 and the second duct 320, will be described in more detail, with reference to FIG. 11. For reference, FIGS. 10 and 11 illustrate an embodiment in which the guide duct 300, i.e., the first duct 310 and the second duct 300 are rectangular. However, the guide duct 300 may have, for an example, a donut form, or the inside circumferential surface and the outside circumferential surface of the guide duct 300 may have a variety of forms of a pentagon, hexagon, or octagon, respectively. Therefore, as shown in FIGS. 10 and 11, the form of the guide duct 300 is not limited to the embodiments shown as far as the form has a central first hole 301 with the outside circumferential surface.

At least one first inlet 311 is provided in the outside circumferential surface of the first duct 310, for introduction of the external air into the first duct 310. The first inlet 311 is in communication with the preheat exchanger 400 to be described in detail. As shown in FIGS. 10 and 11, at least one first outlet 312 is provided in the inside circumferential surface in communication with the first hole 301 for guiding the external air from the first duct 310 to the fan 200. The first outlet 312 provided thus in the inside circumferential surface of the first duct 310 may be provided with a first mesh 313 for removing foreign matters from the air.

Referring to FIGS. 10 and 11, at least one second inlet 321 is provided in an inside circumferential surface of the second duct 320 so as to be in communication with the first hole 301 for introduction of the room air into the second duct 320. Alike the first outlet 312, the second inlet 321 may be provided with a second mesh 323 for removing foreign matters from the room air. In the meantime, as shown in FIG. 11, at least one second outlet 322 is provided in an outside circumferential surface of the second duct 320 for discharging the room air from the second duct 320 to the outside of the room. The second outlet 322 formed thus is in communication with the preheat exchanger 400 to be described in more detail as follows.

In the meantime, the preheat exchanger 400 is provided adjoining to the guide duct 300 so as to be in communication with the guide duct 300. As shown in FIGS. 9 and 10, the preheat exchanger 400 is arranged to surround the outside circumferential surface of the guide duct 30, or, though not shown, under the guide duct 300.

The preheat exchanger 400 recovers thermal energy by making the external air and the room air flowing therein to make indirect heat exchange. For this, the preheat exchanger 400 has, not only the guide duct 300, but also the air discharge duct 30 and the air supply duct 20 connected thereto.

Referring to FIGS. 10 and 12, the preheat exchanger 400 is arranged to surround the outside circumferential surface of the guide duct 300, i.e., the first duct 310 and the second duct 320, and includes a plurality of units in communication with each other. The reason the preheat exchanger 400 has the plurality of units to surround the outside circumferential surface of the guide duct 300 is for fabricating a compact indoor unit 10, and improving fabrication and assembly works.

Referring to FIG. 12, each of the units of the preheat exchanger 400 includes a case 410, and heat exchange means 450. The case has a vacant inside, and a plurality of inlets and outlets for making the inside and outside in communication. In more detail, a third outlet 412 is provided in the case 410 so as to be in communication with the first inlet 311 in the guide duct 300, and a fourth inlet 421 is provided in the case 410 so as to be in communication with the second outlet 322 in the guide duct 300. In this instance, the third outlet 412 and the fourth inlet 421 are formed in one of surfaces of the case 410 of the preheat exchanger 400 in contact with the outside circumferential surface of the guide duct 300.

In the meantime, referring to FIG. 12, a third inlet 411 is provided in the case 410 in the unit so as to be in communication with the air supply duct 20, and a fourth outlet 422 is provided to the case 410 so as to be in communication with the air discharge duct 30. It is preferable that only one air supply duct 20 and the air discharge duct 30 are provided. This is for reducing unnecessary thermal, and pressure losses by providing only one air supply duct 20 and air discharge duct 30, because a total length of each of the ducts becomes greater to increase the thermal loss and the pressure loss, if a plurality of the air supply ducts 20 and the air discharge ducts 30 are provided. In this case, the third inlet 411 and the fourth outlet 422 respectively connected to the air supply duct 20 and the air discharge duct 30 are provided only one of the plurality of units.

Figure 4:
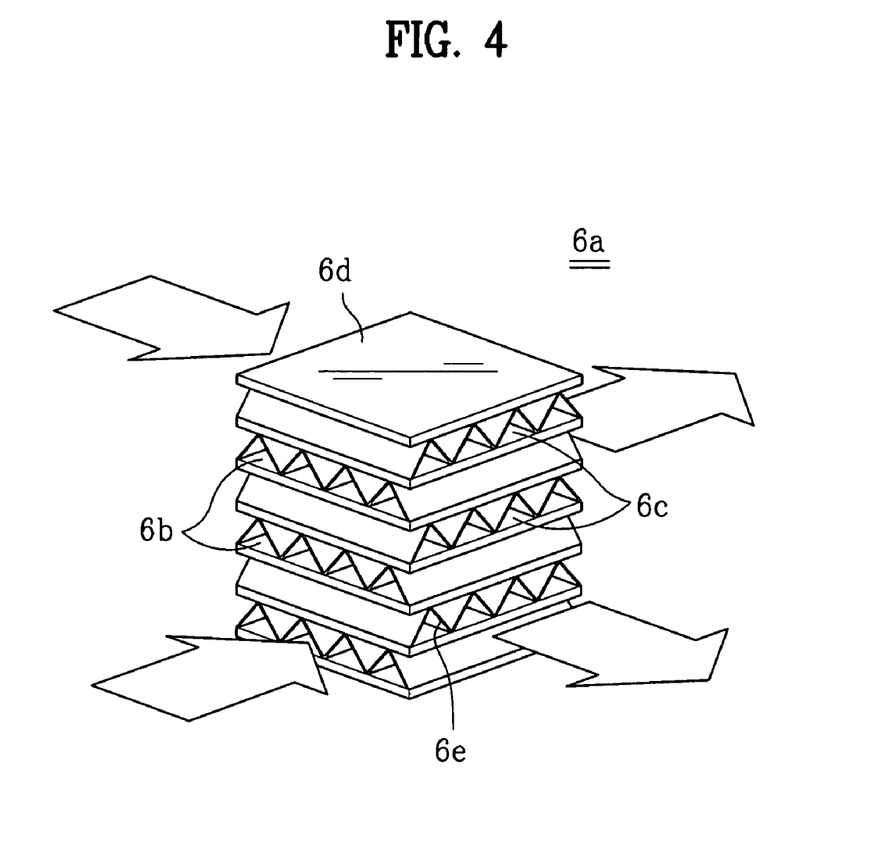
FIG. 4 illustrates a perspective view of heat exchange means in a preheat exchanger in FIG. 3 in accordance with a preferred embodiment of the present invention.

In the meantime, referring to FIG. 12, the heat exchange means 450 is provided in the case 410, for indirect heat exchange between the external air passed through the first inlet 311 and the third outlet 412, and the room air passed through the second outlet 322 and the fourth inlet 421. The heat exchange means 450 includes a first flow passage 541 for flow of the external air and a second flow passage 452 for flow of the room air, which is identical to the embodiment described with reference to FIGS. 3 and 4, and no more description of which will be provided.

In the meantime, the first flow passage 451 in the heat exchanger means 450 for flow of the external air has one end in communication with the third outlet 412 connected to the first inlet 311 in the guide duct 30, and the other end in communication with the third inlet 411 having the air supply duct 20 connected thereto. The second flow passage 452 for flow of the room air has one end in communication with the fourth inlet 421 connected to the second outlet 322 in the guide duct 300, and the other end in communication with the fourth outlet 422 having the air discharge duct 30 connected thereto.

Referring to FIG. 8, different from the first embodiment, in the air conditioning system in accordance with a second preferred embodiment of the present invention, the means for supplying fresh air is connected to the air supply duct 20. The means, including a tank 60 having a nozzle and a controlling part, which are similar to the first embodiment described with reference to FIG. 7, and of which description will be omitted. However, in the second embodiment, the nozzle in the tank 60 is in communication with the air supply duct 20. The nozzle is made to be in communication with the air supply duct 20 with an intermediate medium, such as hose, or the like, or fitted to the air supply duct 20, directly. The fitting of the nozzle is adequate as far as the nozzle can be easily attachable/detachable to/from the tank 60.

As the fresh air compressed, and stored in the tank 60, the air identical to one described in the first embodiment can be used. Therefore, description of the air will be omitted.

In the meantime, referring to FIG. 8, there is a valve 80 at one point of the air supply duct 20, more specifically at an intermediate point of an end in contact with the outside of the room and a point the means is connected thereto, for opening/closing the flow passage of the external air introduced into the room from the outside of the room.

The operation of the foregoing improved air conditioning system in accordance with a second preferred embodiment of the present invention will be described. When the fan 200 is put into operation in a state the air supply fan 25 and the air discharge fan 35 are not in operation, the room air moves up through the first hole 301 in the guide duct 300, and is discharged toward the indoor heat exchanger 100 by the fan. The air, heat exchanged to be cooled or heated at the indoor heat exchanger 100, is discharged to the room again through the second hole 302 in the guide duct 300, to cool or heat the room.

In the meantime, in the state the air supply fan 25 and the air discharge fan 35 are not in operation, since the air flow through the air supply duct 20 and the air discharge duct 30 are small, it is difficult to obtain an effective ventilation effect. If the nozzle on the tank 60 is opened in a state the valve 80 is closed, the fresh air stored in the tank 60 in a compressed state is introduced into the room through the indoor heat exchanger 100 in the indoor unit 10. According to this, an effect the same with the description given in the first embodiment can be obtained.

In the meantime, in the air conditioning system in accordance with the second preferred embodiment of the present invention, the room may be ventilated by using the external air when the external air is not polluted. Such a ventilation process will be described.

The air supply fan 25 and the air discharge fan 35 are put into operation. In this instance, the indoor unit and the outdoor unit 10 may, or may not be operated. A case the indoor unit 10 is in operation will be taken as an example in the following description. When, the air discharge fan 35 is put into operation, the room air is introduced into the second duct 320 through the second inlet 321, and therefrom, introduced into the preheat exchanger 400 through the second outlet 322 and the fourth inlet 421. In this instance, the foreign matters contained in the room air are removed with the second mesh 323 provided to the second inlet 321. The room air introduced into the preheat exchanger 400 moves through the second flow passage 452, and is discharged to the outside of the room through the fourth outlet 422 and the air discharge duct 30.

In the meantime, when the air supply fan 25 is put into operation, the fresh external air is introduced into the preheat exchanger 400 through the air supply duct 20 and the third inlet 411. The external air introduced into the preheat exchanger 400 moves through the first flow passage 451. In this instance, since the room air moves through the second flow passage in contact with the first flow passage 451, the external air flowing in the first flow passage 451 receives heat form the room air, indirectly.

The external air, cooled or heated as the external air passes through, and receives heat from the room air by the foregoing method, at the heat exchange means 450 in the preheat exchanger 400, is introduced into the first duct 310 in the guide duct 300 through the third outlet 412 and the first inlet 311. Then, the external air is introduced into the fan 200 through the first outlet 312 and the first hole 301, and cooled or heated again as the external air passes through the indoor heat exchanger 100. The external air, cooled or heated as the external air passes through the indoor heat exchanger 100, is discharged to the room through the second hole 302 in the guide duct 300.

When the nozzle of the tank 60 is opened in the foregoing ventilation process, fresh air is introduced into the room together with the external air. In the meantime, when the nozzle on the tank 60 is opened in a state the valve 80 is closed during the ventilation process, the polluted room air is discharged to the outside of the room through the discharge duct 30, and only the fresh air stored in the tank 60 is supplied to the room.

In the foregoing description, examples in which the room is ventilated or the fresh air is supplied thereto at the same time with cooling or heating, are given. However, in the second embodiment, the air conditioning system may also be operated such that the fresh air stored in the tank 60 is supplied to the room in a state the cooling or heating function is not in operation.

As has been described, the improved air conditioning system of the present invention has the following advantages.

First, the supply of fresh air stored separately permits an actual ventilation effect even without actual ventilation in a case the external air is polluted, heavily. According to this, a comfortable room environment can be maintained even in a case the environmental pollution or yellow sand is heavy.

Second, when air taken in a mountainous area is used as the fresh air, the fresh air supplied to the room carries out antibacterial, and bactericidal activity, and provides a forest bath effect to a human body.

Third, since no large amount of air is discharged to the outside of the room at a time, to prevent waste of thermal energy, an energy efficiency is improved.

Fourth, since the indoor unit is very compact, and requires no complicate arrangement of separate air supply and discharge ducts, the installation is very easy.

Fifth, in the case of the second embodiment, the thermal energy of the room air discharged to the outside of the room is transferred to the external air supplied to the room by using the preheat exchanger in ventilation. According to this, waste of the thermal energy can be prevented effectively in the ventilation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioning system comprising:
    an outdoor unit having a compressor and an outdoor heat exchanger;
    an indoor unit in a ceiling having an indoor heat exchanger with a space therein in communication with a room, and a fan in the space for drawing, and discharging air through the indoor heat exchanger; and
    a fresh air supplier controlled by a controlling part, connected to the indoor unit, and supplying fresh air stored separately to an inlet side of the fan.

2. The air conditioning system as claimed in claim 1, further comprising a guide duct provided under the indoor heat exchanger, for guiding room air and the fresh air from the fresh air supplier to the fan, and air passed through the indoor heat exchanger to the room.

3. The air conditioning system as claimed in claim 1, wherein the fresh air supplier includes;
    a tank for storage of fresh air, having a nozzle and a controlling part for controlling opening/closing of the nozzle, and
    a hose having one end connected to the nozzle and the other end connected to the indoor unit.

4. The air conditioning system as claimed in claim 3, wherein the tank is rechargeable with the fresh air, and the hose is detachable to the nozzle.

5. The air conditioning system as claimed in claim 1, wherein the fresh air is air taken in a mountainous area.

6. The air conditioning system as claimed in claim 1, wherein the fresh air is air having dust removed therefrom.

7. The air conditioning system as claimed in claim 1, wherein the fresh air is air having a high oxygen content.

8. The air conditioning system as claimed in claim 1, wherein the fresh air is air having terpene added thereto.

9. The air conditioning system as claimed in claim 1, wherein the fresh air is air having phytoncide added thereto.

10. The air conditioning system as claimed in claim 1, wherein the fresh air is stored in the fresh air supplier in a compressed state.

11. An air conditioning system comprising:
    an outdoor unit having a compressor and an outdoor heat exchanger;
    an indoor unit in a ceiling having an indoor heat exchanger with a space therein in communication with a room, a fan in the space for drawing, and discharging air through the indoor heat exchanger, and a guide duct under the indoor heat exchanger for guiding external air to the room through the fan and room air to an outside of the room;
    an air supply duct and an air discharge duct in communication with the guide duct for guiding the external air to the room and the room air to the outside of the room, respectively; and
    a fresh air supplier controlled by a controlling part, connected to the air supply duct, and supplying fresh air stored separately to an inlet side of the fan.

12. The air conditioning system as claimed in claim 11, further comprising a preheat exchanger arranged to surround the guide duct, and connected to the air supply duct, the air discharge duct, and the guide duct, for indirect heat exchange between the external air and the room air passing through insides of the preheat exchanger.

13. The air conditioning system as claimed in claim 12, wherein the guide duct includes;
    a first duct under the indoor heat exchanger for guiding the external air passed through the preheat exchanger to the fan, and
    a second duct under the first duct for guiding the room air to the preheat exchanger.

14. The air conditioning system as claimed in claim 13, wherein the guide duct includes;
    a first hole provided in a central part in an up/down direction so as to make the space and the room in communication; and
    at least one or more than one second hole provided around the first hole in the up/down direction for introduction of the air passed through the indoor heat exchanger into the room.

15. The air conditioning system as claimed in claim 14, wherein the first duct includes;
    at least one or more than one first inlet provided to one side thereof so as to be in communication with the preheat exchanger, and
    at least one or more than one first outlet formed in an inside circumferential surface thereof for communication with the first hole.

16. The air conditioning system as claimed in claim 14, wherein the second duct includes;

at least one or more than one second inlet provided to an inside circumferential surface thereof so as to be in communication with the first hole, and at least one, or more than one second outlet provided to one side thereof so as to be in communication with the preheat exchanger.

17. The air conditioning system as claimed in claim 12, wherein the preheat exchanger includes;

a vacant case having a third outlet in communication with the first inlet in the guide duct, and a fourth inlet in communication with the second outlet in the guide duct, and a pre-heat exchanger in the case for indirect heat exchange between the external air passing through the first inlet and the third outlet, and the room air passing through the second outlet and the fourth inlet.

18. The air conditioning system as claimed in claim 17, wherein the pre-heat exchanger includes;

a plurality of plates spaced at regular intervals to form first flow passages for flow of the external air, and second flow passages for flow of the room air in layers alternately, and a plurality of flow guides each provided between adjacent plates in each of the layers in parallel to flow directions of the external air and room air respectively, having a cross section with a plurality of folds.

19. The air conditioning system as claimed in claim 11, further comprising an air supply fan on the air supply duct for supplying the external air to the room, and an air discharge fan on the air discharge duct for discharging the room air to the outside of the room.

20. The air conditioning system as claimed in claim 11, wherein the air supply duct further includes a valve mounted between an end in communication with the outside of the room and a point the fresh air supplier is connected for opening/closing a flow passage of the room air.

21. The air conditioning system as claimed in claim 11, wherein the fresh air supplier includes;

a tank having a nozzle in communication with the air supply duct, and a controlling part for controlling open/close of the nozzle, for storage of fresh air in a compressed state.

22. The air conditioning system as claimed in claim 21, wherein the tank is rechargeable with the fresh air, and the hose is detachable to the nozzle.

23. The air conditioning system as claimed in claim 11, wherein the fresh air is air taken in a mountainous area.

24. The air conditioning system as claimed in claim 11, wherein the fresh air is air having dust removed therefrom.

25. The air conditioning system as claimed in claim 11, wherein the fresh air is air having a high oxygen content.

26. The air conditioning system as claimed in claim 11, wherein the fresh air is air having terpene added thereto.

27. The air conditioning system as claimed in claim 11, wherein the fresh air is air having phytoncide added thereto.

28. The air conditioning system as claimed in claim 11, wherein the fresh air is stored in the fresh air supplier in a compressed state.

29. An air conditioning system comprising:

an outdoor unit;

an indoor unit having a fan supplying air to indoor space, and an indoor heat exchanger exchanging heat with the air supplied to the indoor space; and a fresh air supplier, storing fresh air therein separate from outdoor space and the indoor space, and providing the fresh air for the indoor space.

30. The air conditioning system as claimed in claim 29, wherein the fresh air supplier is configured to allow the fresh air to join the air being supplied to the indoor space by the fan.

31. The air conditioning system as claimed in claim 29, wherein the fresh air supplier comprises;

a tank storing the fresh air therein, and having a nozzle; and a hose having one end connected to the nozzle and the other end connected to the indoor unit.

32. The air conditioning system as claimed in claim 29, wherein the fresh air is stored in the fresh air supplier in a compressed state.

33. The air conditioning system as claimed in claim 29, wherein the fresh air is rechargeable.

34. The air conditioning system as claimed in claim 31, wherein the tank is detachably coupled to the outdoor unit or the indoor unit.

35. An air conditioning system comprising:

an outdoor unit;

an indoor unit in a ceiling having a fan supplying air to indoor space and an indoor heat exchanger exchanging heat with the air supplied to the indoor space; and a fresh air supplier connected to the indoor unit, configured to store fresh air separately, and further configured to supply the fresh air into the indoor space.

36. The air conditioning system as claimed in claim 35, wherein the fresh air supplier is configured to add the fresh air to the air being supplied to the indoor space by the fan.

37. The air conditioning system as claimed in claim 35, wherein the fresh air supplier comprises;

a tank storing the fresh air therein, and having a nozzle; and a hose having one end connected to the nozzle and the other end connected to the indoor unit.

38. The air conditioning system as claimed in claim 35, wherein the fresh air is rechargeable.

* * * * *